(12) United States Patent
Mahoney

(10) Patent No.: US 9,979,467 B1
(45) Date of Patent: May 22, 2018

(54) TROPOSCATTER COMMUNICATIONS SYSTEM

(71) Applicant: Paul F Mahoney, Hull, MA (US)

(72) Inventor: Paul F Mahoney, Hull, MA (US)

( * ) Notice: Subject to any disclaimer, the term of this patent is extended or adjusted under 35 U.S.C. 154(b) by 291 days.

(21) Appl. No.: 14/757,747

(22) Filed: Dec. 23, 2015

Related U.S. Application Data

(60) Provisional application No. 62/096,145, filed on Dec. 23, 2014.

(51) Int. Cl.
  H04B 7/22 (2006.01)

(52) U.S. Cl.
  CPC ..................... H04B 7/22 (2013.01)

(58) Field of Classification Search
  None
  See application file for complete search history.

(56) References Cited

U.S. PATENT DOCUMENTS

| | | | |
|---|---|---|---|
| 4,281,411 A * | 7/1981 | Bonn | H04L 1/06 375/232 |
| 4,601,046 A | 7/1986 | Halpern et al. | |
| 4,615,040 A | 9/1986 | Mojoli et al. | |
| 5,255,269 A | 10/1993 | Stem, Jr. | |
| 5,752,173 A * | 5/1998 | Tsujimoto | H04B 7/0845 375/299 |
| 6,128,276 A * | 10/2000 | Agee | H04B 1/692 370/208 |
| 6,360,369 B1 * | 3/2002 | Mahoney | H04B 1/1036 348/E5.003 |
| 6,512,737 B1 | 1/2003 | Agee | |
| 6,990,078 B2 | 1/2006 | Kim et al. | |
| 7,155,171 B2 | 12/2006 | Ebert et al. | |
| 7,751,372 B2 | 7/2010 | Monsen | |
| 2003/0153273 A1 * | 8/2003 | Ebert | H04L 1/0001 455/67.14 |
| 2006/0182193 A1 * | 8/2006 | Monsen | H04L 25/03057 375/267 |
| 2007/0230327 A1 | 1/2007 | Cho et al. | |
| 2014/0140195 A1 | 5/2014 | Kusunoki | |
| 2017/0338978 A1 * | 11/2017 | Monsen | H04L 25/03019 |

* cited by examiner

*Primary Examiner* — Nicholas Sloms
(74) *Attorney, Agent, or Firm* — John P. McGonagle

(57) ABSTRACT

A method of implementing troposcatter communications is provided. Transmittal of signals between receive and transmit antennas is performed in the time domain. After reception of a transmitted signal, the signal is converted to the frequency domain for signal processing. After signal processing, the signal is converted back into the time domain.

6 Claims, 7 Drawing Sheets

-- PRIOR ART --

-- PRIOR ART --

FIG. 4 RF SECTION OF RECEIVER

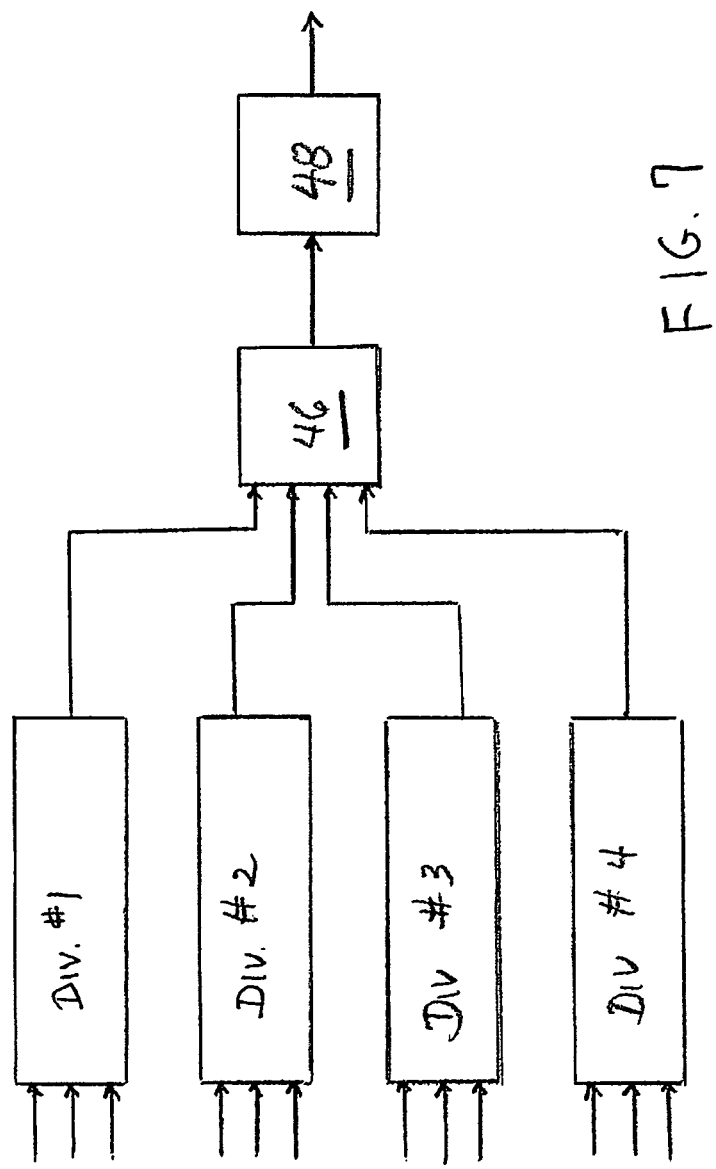

TROPOSCATTER COMMUNICATIONS SYSTEM

CROSS-REFERENCE TO RELATED APPLICATIONS

Applicant claims the priority benefits of U.S. Provisional Patent Application No. 62/096,145, filed Dec. 23, 2014.

BACKGROUND OF THE INVENTION

This invention relates to communications systems, and in particular to troposcatter communications systems.

Troposcatter radio links have been in use for more than 60 years. The early systems used FM/FDM modulation which were limited to a couple of dozen voice channels. These links were used by commercial carriers across the southern USA. The DEW line in Alaska, Northern Canada and Greenland used Tropo radios also. Many militaries have Troposcatter radio systems. Troposcatter links are used to communicate to offshore locations such as oil platforms or offshore islands. These systems can transmit data over the horizon usually at distances from 25 to 200 miles; a few links operate up to 400 miles. The advantage of Troposcatter systems is that they can be quickly set up and they provide reliable broadband data links over the horizon. The main competition for Troposcatter links are satellite links. These have displaced many Troposcatter links. However satellite links are very expensive to put up and are expensive to rent. It also takes a while to put a satellite in orbit. In many situations Troposcatter links are more economical. The medium for troposcatter communications is the scattering of radio waves from the upper part of the troposphere this is a layer from ground level to about twelve miles above the earth. Scattering is only detectable when the radio beams are both narrow and both close to horizontal. FIG. 1 shows the path. The antenna beam width is much narrower than shown and the elevation angles are exaggerated for clarity. Transmit and receive antennas are each pointed at a volume of the troposphere above the midpoint of the path. The path loss increases quickly as the beams are pointed away from the optimum position so the two beams must be pointed accurately. The scattering results from thermal inhomogeneity in the air at that elevation of the common volume. The path loss is very high so the transmit power must be high and the antennas must be large. In most cases the signal is sent four times in parallel from two transmitters at different frequencies and is received at both frequencies by each of two receive antennas so the receiver has four copies of the transmit signal. The distortion on each path is different and independent of the others. If these four copies (diversities) are properly combined the signal can be reliably detected. This is called four diversity reception. Some troposcatter systems receive just two copies of the signal. These Dual diversity systems are lighter and more portable but have less range and less reliability. There are a few other ways to set up a troposcatter link. The set up described above is a 2 Frequency/2Space system. In some cases angle diversity can be used. Angle diversity uses two feeds on each antenna so that two beams can be formed at slightly different angles from one antenna usually one beam above the other. The common volume of the upper beams is different from the common volume of the lower beam so the scattering is different in the two beams. This means that they are statistically independent and can be combined in the same way as described above. Angle diversity is generally less robust than two frequency/two space systems because neither beam is pointed at the optimal spot. Usually the lower beam is pointed somewhat into the ground and the upper beam is pointed above the optimum angle.

A troposcatter link can also be set up using a single transmit antenna and power amplifier at each end and four receive antennas, one of which can be transmit antenna. This would be a 1 Frequency/4Space system. This invention works with any known diversity scheme.

In the 1970s and 1980s digital troposcatter modems were developed these were a major advance, data rates up to 12 Mb/S were possible. These modems operated in the time domain. The accuracy of the equalization was limited. Today the similar techniques have resulted in modems that operate at rates of up to 20 Mb/S.

Troposcatter radio modems are used for communications over distances longer than the radio horizon. This is possible by using the scattering of the troposphere. A small amount of the signal power is scattered toward the receiver when the radio wave passes through the troposphere at roughly 10 miles above the earth's surface. This requires large antennas and high power amplifiers at each end of the link. The scattering process causes the signal to be dispersed (spread out) in time so that multiple copies of the signal arrive at the receiver. These 'multipath' signals interfere with one another and cause the signal to fade continuously which can cause errors. To mitigate this effect the links are usually built with two antennas and two power amplifiers at each end operating at different frequencies, resulting in a four diversity system. The receiver has four independently fading copies of the signal. By properly combining these, the performance can be greatly improved. However the multipath effect limits the maximum data rate to about 20 Mb/S using existing troposcatter modems. The reason for this is that the power must be increased as the data rate is increased and the signal processing becomes more and more difficult as the data rate increases. This invention addresses the signal processing problem by using a new novel frequency domain technique to make the signal processing difficulty much less dependent on the data rate and the amount of dispersion. This invention addresses the power limitation by using a new technique to improve diversity combining, to adapt the data rates to the channel conditions and to use modern coders in a way that balances the error rate requirements with the power available.

In combination the techniques disclosed herein, will allow several advances in troposcatter communications, the possible data rates data rates will be much higher than earlier systems and the error rates can be easily controlled to provide the highest data rate for a given max error rate.

It will also allow greatly improved performance in dual diversity or single diversity systems making lighter and less expensive systems possible.

SUMMARY OF THE INVENTION

The objective of this invention is to provide a new way to implement troposcatter transmitters and receivers that will improve the performance and reduce cost, size, weight and power. The primary objective is to do the processing in the frequency domain. This alone has significant advantages, but also leads to some other techniques that allow improvements in data rate, error rate and terminal size. The optimum configuration for any application may use all of these techniques or a subset to achieve the best solution. Existing troposcatter communications systems could add these techniques to improve performance. For some applications the number of antennas and power amplifiers may be reduced.

In other cases the data rate may be increased or the range increased or the bit error rate reduced. Most of these techniques are implemented by high speed digital processing, trading signal processing for RF equipment. These techniques will allow bit error rate performance equal to or superior to the currently used troposcatter radio systems at the same data rates and same occupied spectrum bandwidth at lower cost and higher portability. Dual diversity systems may be replaced by single diversity systems and quadruple diversity systems by dual diversity systems. Troposcatter systems that operate near airports are often disturbed by aircraft. When an aircraft flies through or near the common volume, most troposcatter systems are disturbed for ten to thirty minutes, especially when the signal level of the aircraft echo is about the same size as the troposcatter signal. This happens because the time domain systems have a limited delay span over which they can operate. The frequency domain equalizer described herein does not have this limitation, so this problem is automatically eliminated by this invention. The frequency domain equalizer uses the aircraft echo to improve the signal, in fact, the data rate could be increased while the aircraft is present. This invention introduces three techniques:
1. Frequency Domain Troposcatter Channel Equalization and diversity combining with time domain signal transmission;
2. FSSD Frequency search and select diversity; and
3. Frequency Domain Channel Estimation and timing recovery Frequency Domain Equalization and Diversity Combining The first technique in this invention is to do the receiver signal processing in the frequency domain as opposed to the time in the time domain as currently available systems do. The transmit signal is developed in the time domain. This means that the transmit signal is made the same as in current systems. It usually uses QPSK modulation although other modulation formats are possible with this invention. QPSK is desirable because high power amplifiers are required and these are expensive. High power amplifiers are most efficient when the signal has a low peak to average ration, QPSK provides this. At the receiver the signal is converted to baseband and the in-phase and quadrature components are detected. (FIG. 4). These are then passed through a fast Fourier transform (FFT) block that forms the frequency domain version of the signal. No information is lost ion this process the signal may be recovered by passing it through an inverse fast Fourier transform (IFFT). Because the signal has passed through a troposcatter channel it is distorted. The amount of distortion depends on the channel. The channel is characterized by a number referred to as "two sigma over tau" or 2sigma/T where sigma is the rms spread of the channel and T is the symbol interval of the signal. The distortion is higher for higher values of this number. For high data rate systems T can be very small meaning the signal is highly distorted even for moderately distorted channels. Time domain equalizers have been developed that operate at data rates up to 20 Mb/S. The most sophisticated of these modems use matrix techniques to equalize the channel. As data rates go up the channels become more and more difficult to equalize and the ability to handle very dispersive links limits the performance of these systems. Frequency domain equalization is much easier and requires much less processing to do the equalization. In the frequency domain the amount of processing goes up linearly with 2sigma/T, compared to time domain techniques which go up as the cube of 2Sigma/T. For time domain systems the signal processing load becomes very large as the data rate goes up.

In frequency domain equalization the processing does go up with data rate but linearly not by the cube and if it operates at one 2sigma/T for one data rate it will operate for any 2sigma/T at that data rate. Time domain equalizers are often limited by the number of taps in the equalize. When 2sigma/T is larger than the number of taps, the system will fail. In the frequency domain this is not a limitation at all.

In the frequency domain the channel equalization is almost as easy as simply dividing the frequency domain signal by the FFT of the channel. However a difficulty comes up when the channel fades towards zero; dividing the signal by very small numbers causes the noise to become very large. If there are multiple diversities the noise in the stronger diversity branches will be summed with the exaggerated noise from the weak frequency bins. The same is true when combining frequency bins. The solution to this is to use a maximal ratio diversity combining technique. A simple version of this is a technique has been used in antenna diversity systems where signals from multiple antennas are combined but in this case it is done in the frequency domain in every bin in the FFT and for all explicit diversities. The optimum diversity combiner for a multiple diversity system is as follows:

$$ODC(k) = \sum_{d=1}^{d=NDIV} \frac{Hd(k) * Yd(k)^*}{|Hd(k)|^2 + |Hd(k)|/(EbNod(k))} \qquad \text{Equation (1.0)}$$

ODC(k)=Optimum Diversity Combiner
d=diversity number
k=frequency bin number
NDIV=number of diversities
HD=frequence response of diversity d at frequency k
Yd=Signal received at diversity d in frequency bin k
EbNod=Energy per bit per Hz at diversity d, frequency k The numerator multiplies the signal by the conjugate of the channel response this removes the phase shift of the channel. If the signal to noise ratio is high the second term in the denominator is near zero so all that is left is the magnitude squared of the channel gain which should be equal to the magnitude of the channel times the conjugate of the signal so if the channel estimate is good the channel is equalized. If the signal to noise ratio is low the signal in this bin is suppressed by the Eb/No term in the denominator. If the signal power equals the noise power the gain is one half. So the noise power contributed by any bin is always less than the signal power contribution from that bin. This process does equalization and combining of all diversities and all frequency bins while limiting the noise in any bin.

Frequency Search and Select Diversity (FSSD)

Achieving diversity requires that the bandwidth available be larger than the bandwidth of the signal. The bandwidth can be from added diversity channels in space, angle or frequency. It can also be obtained by having added contiguous bandwidth that is not always used. FSSD is this type of diversity. It both increases power and provides diversity and is very simple. It requires that the bandwidth of the channel allocation be larger than the instantaneous signal bandwidth, but reduces the number of diversities actually used. Typically the bandwidth allocations are in blocks of about 25 MHz for each diversity, in each direction. For a two frequency two space system this would require two 25 MHz blocks in each direction. Using single 50 MHz block this technique provides better performance with just one frequency and one transmitter. The 50 MHZ band is searched to find best frequency location and update it every few milliseconds. The performance is better than simply having two channels operating side by side because the best center frequency is unlikely to be at the center frequency of either channel, always selecting the best channel means the average signal is higher and the probability of getting a severe fade is lower. This provides performance close to or better than a dual diversity system. The bandwidth used by this system is the same as a conventional system while using one less high power amplifier (HPA). In comparison to an angle diversity system this system has better performance because the antenna can be directed at the optimum angle, where an angle diversity system must be offset by about a quarter of a degree to make the two beams uncorrelated, this increases the link loss by about three decibels.

Frequency Domain Channel Estimation and Time Synchronization

Each block of data in this system contains on the order of 1000 encoded data symbols, plus an un-encoded reference block of about 100 symbols, plus a cyclic prefix (CP). The CP is used to eliminate block to block interference. The CP is a repeat of the first n symbols of the block where n is large enough that nT exceeds the channel delay spread. The reference block is used both for timing synchronization and for channel estimation. In some blocks the carrier frequency during the reference block is the same as the rest of the block at other times the carrier is switched to allow the channel outside the band being used by the data signal to be measured, this is done at both ends of the link The timing is accomplished in the time domain by correlating the known reference with signal received during the reference block. The timing uses two loops one for acquisition and one for tracking. A coarse timing discriminator is used for acquisition. Two blocks of the local reference one delayed from the other by half the length of the symbols in the reference block are used to create an early estimate and a late estimate to form an early/late time discriminator. This discriminator controls a crystal oscillator or timing synthesizer. For timing tracking a slightly different discriminator is used it is also an early late type discriminator but in this case the time separation between local reference blocks is the length of one symbol. This is used to insure rapid initial acquisition or recovery from a sync loss while maintaining accurate tracking. Since the channel and terminals are stationary the timing can be very accurate and very unlikely to lose lock or to suffer any degradation due to timing errors.

The reference symbols are used for channel measurements. Also, in this case the processing is done in the frequency domain. A processor in the receiver is coordinated with a processor at the transmitter through a few bytes embedded in the data. The reference block has the same carrier frequency as the data part some of the time at other times the carrier is shifted to allow the channel outside the bandwidth of the data traffic to be measured, this is to allow the best channel on the allocated bandwidth to be used at all times.

This process is controlled by software that examines the measured channel and determines when the center frequency should be shifted for best performance. When the channel is wide the channel does not need to be sampled in frequency finely as when it is narrow or highly dispersed. For the wideband case the FFT used for channel estimation can be shortened so that the spacing between frequency samples is more spread out. This concentrates the energy in the samples to a smaller number so the signal to noise ratio in each is higher. The reference blocks are shorter than the data blocks, roughly 10 percent of a data block. If we use a an FFT which has as many samples as the reference, the spacing of the bins will be ten times the spacing of the bins in data detection which produces a higher signal to noise in these bins. The transmitted reference is selected to provide close to a uniform spectrum. This process produces a channel estimate with different bin spacing than the required channel estimate. The software interpolates the estimate to fill in the spacing.

BRIEF DESCRIPTION OF THE DRAWINGS

FIG. 7 is a diagrammic view of the Equalizer and Combiner.

DETAILED DESCRIPTION OF THE INVENTION

Figure 1:
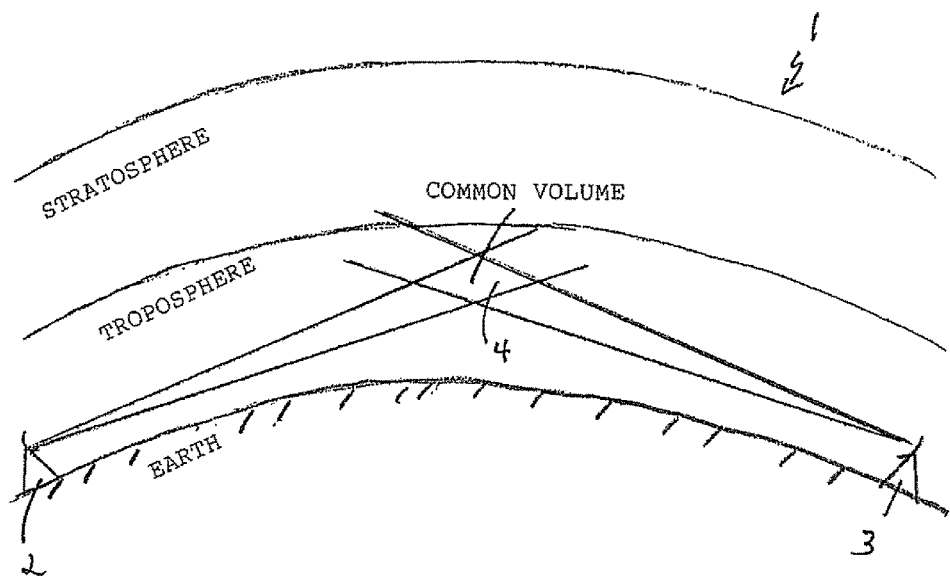
FIG. 1 illustrates the profile of a typical troposcatter path.

Referring to the drawings in detail wherein like elements are indicated by like numerals. There is shown in FIG. 1 a basic troposcatter communications system 1, comprised of at least one transmitter 2 and one receiver 3 aimed at a common point, termed the common volume 4, in that atmospheric area above the earth, termed the troposphere.

Figure 2:
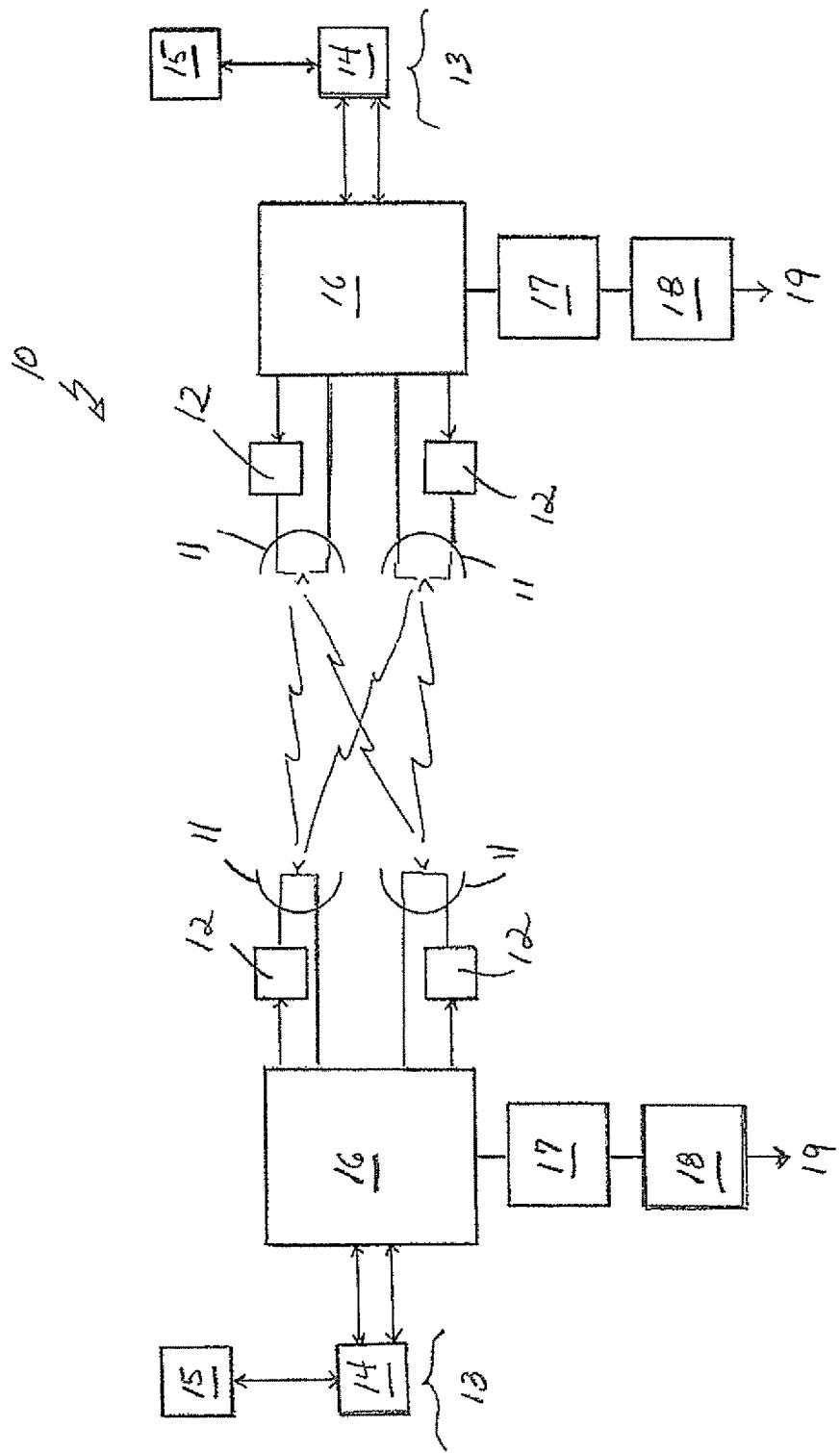
FIG. 2 is a diagrammic view of a dual or quad diversity troposcatter system.

FIG. 2 shows a quad diversity system 10 where there are two power amplifiers 12 at each end and two antennas 11 on each end to produce four copies of the signal at each end. Thus it is a quad diversity system. The antennas each receive signals from both power amplifiers. The antennas are spaced far enough away so that the signal from each power amplifier fades independently of the other. This is the most common troposcatter configuration. User traffic 13 enters and is received from the system 10 through a troposcatter modem 14 having external monitoring and control 15. The troposcatter modems 14 pass and receive data through a dual and quad diversity frequency converter assembly 16. Received data is passed through a demodulator 17 and signal processor 18 for output.

Figure 3:
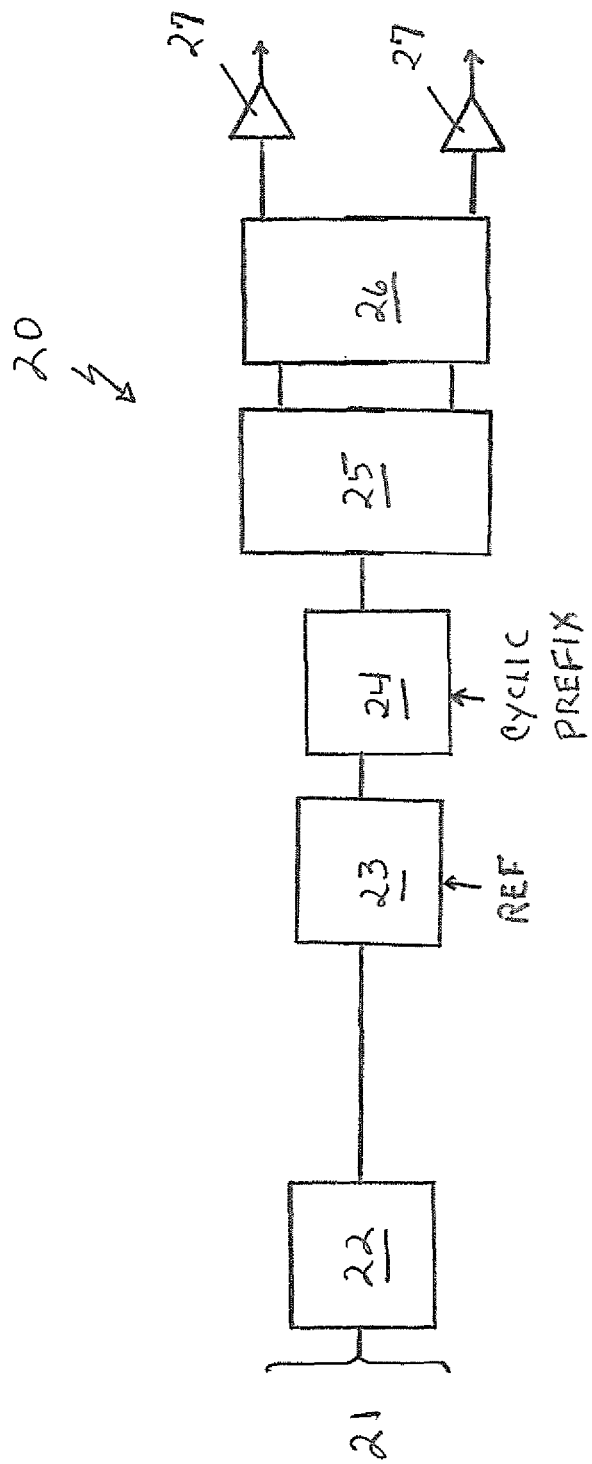
FIG. 3 is a diagrammic view of the troposcatter transmit section.

FIG. 3 shows The Transmit Section 20 of a two frequency diversity system. The input is formatted according to the user's needs then made into blocks that match the systems needs and then the data is passed through a Forward Error Correction (FEC) encoder 22. The use of Error correction coding and decoding can greatly reduce the error rate. Following the FEC encoder is a block 23 that inserts a reference. The reference is a set of known symbols that can be used by the receiver to estimate the channel characteristics. This is followed by cyclic prefix insertion 24. The cyclic prefix is a repeat of the first bits or symbols in the transmit block of symbols. This makes a Fast Fourier Transform (FFT) operation at the receiver a circular FFT which is not sensitive to edge effects. Following this the signal passes through two modulators 25 and two RF up-converters 26. Then the signal is passed through two power amplifiers 27.

Figure 4:
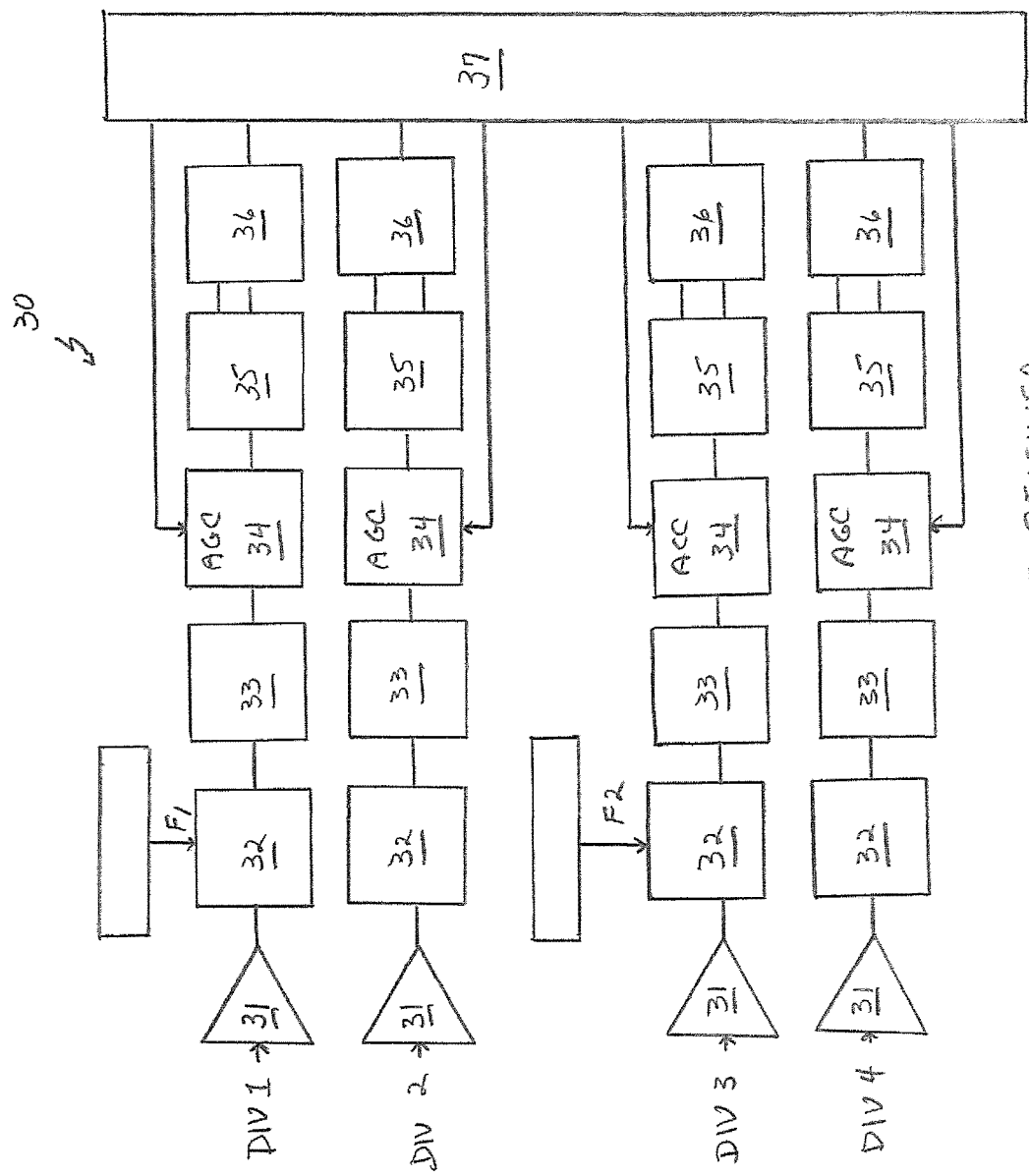
FIG. 4 is a diagrammic view of the RF section of the receiver.

FIG. 4 shows the RF section 30 of the receiver. Each of the input signals pass through a low noise amplifier (LNA)

31 then is passed through a down converter 32 then via an IF/RF filter 33 to an automatic gain controller (AGC) amplifier 34. The gain control from the AGC amplifier comes from the digital processor 37 to follow. Then each signal is passed through a baseband converter 35 and then passed through a complex A/D converter 36 pair. This arrangement is common in modern digital receivers. The down conversion could be done in a single step from RF to baseband with the AGC being an RF amplifier. This depends upon the RF frequency and available components.

Figure 5:
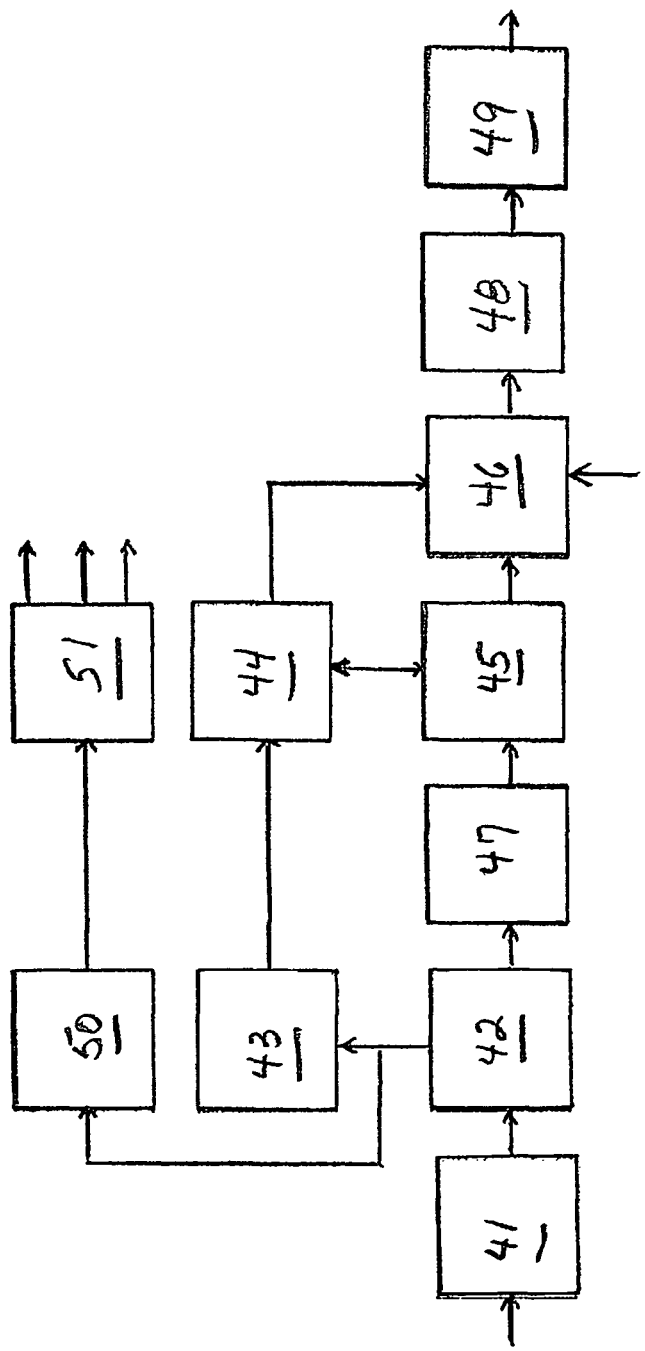
FIG. 5 is a diagrammic view of the wideband processing section.

FIG. 5 shows the wide band section 40 of the signal processing. The signal enters at baseband and is converted to digital form by an A/D converter 41. The signal is then passed to an extractor/splitter module 42 where the reference portion of the signal is extracted 42 and passed through a first FFT block 43 then to a channel estimator 44. The channel estimator is shown in more detail in FIG. 6. The output of the channel estimator 44 goes to the FSSD (frequency shift and select diversity) processor 45 and the Equalizer/signal combiner 46. The data (I and Q) portion of the signal from the A/D converter 41 is passed through a second FFT 47 to the FSSD processor 45. The output of the FSSD processor is then passed to the Equalizer/Combiner 46 and into an IFFT block 48 that converts the signal back to the time domain. The output of other diversities are also entered into the Equalizer/Combiner. The output of the IFFT block goes to the FEC decoder 49 which produces the final data out. Timing is maintained by a conventional early late discriminator operating in the time domain. The discriminator is comprised in part of a time synchronizer 50 and a timing synthesizer 51. The local copy of the reference symbols is correlated with the received reference to produce a time discriminator which increases or decreases the timing phase to keep the received reference lined up with the local copy of the reference.

Figure 6:
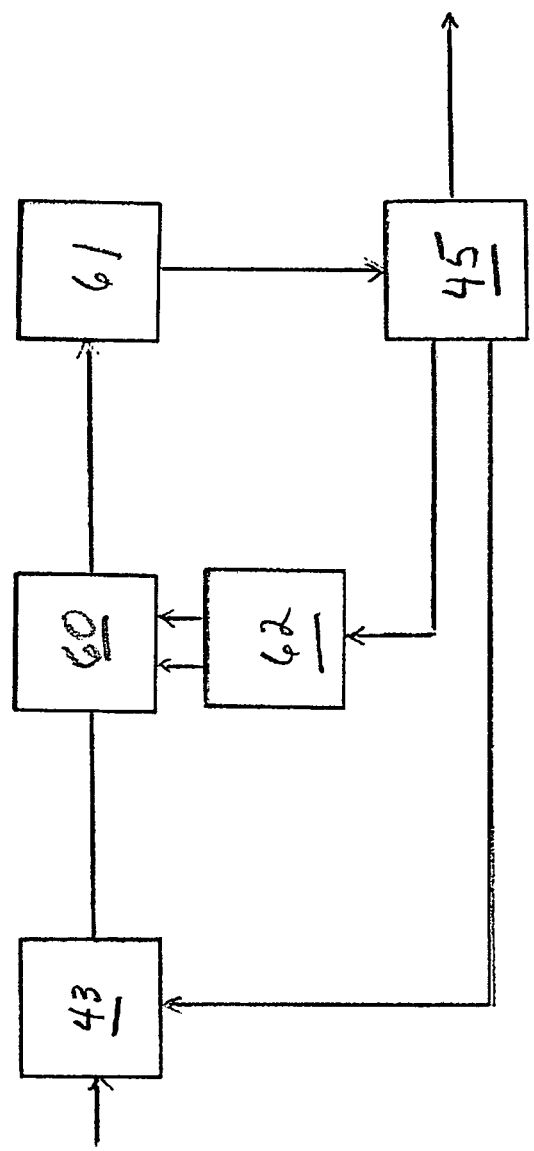
FIG. 6 is a diagrammic view of the FSSD and channel estimator.

FIG. 6 shows the FSSD and channel estimator. The input to this block are the reference symbols. These are converted to the frequency domain through the FFT block 43 and then passed to the frequency bin correlator 60 within the channel estimator. The frequency bin correlator 60 correlates the frequency domain version of the reference symbols with the frequency domain version of the local stored reference 62. The result of this process is accumulated in the frequency bin accumulator 61 of the channel estimator to produce the rough channel estimate. This estimate is rough because the size of the FFTs used to convert both the reference symbols and the local reference to the frequency domain is smaller than the FFTs used to process the data symbols. This concentrates the power into a smaller number of frequency bins which produces a higher signal to noise ratio in the reference. The software in the processor takes the rough channel estimate and puts in through an interpolation filter that has as many bins as the data symbols. The FSSD processing involves changing the center frequency of the transmitted signal during some reference blocks to allow the channel to be measured over the entire available bandwidth. This produces the best channel available in the band available. The pattern of the center frequency shifts is known at both ends of the link and the link is synchronized so both ends set the center frequency the same. The rough channel estimates of the entire available bandwidth are input to the processor which selects the best carrier frequency to be used by the data symbols.

FIG. 7 shows the Equalizer and combiner. The inputs to this block are the frequency domain received data signal, the channel estimate and the EbNo for each frequency bin for each diversity branch. The EbNo is the signal to noise ratio at each bin which is known and usually constant. The four blocks shown implement the processing describes above for equation 1. The results are summed to produce the input to the IFFT block which forms the input to the FEC decoder.

It is understood that the above-described embodiments are merely illustrative of the application. Other embodiments may be readily devised by those skilled in the art, which will embody the principles of the invention and fall within the spirit and scope thereof.

I claim:

1. A method of implementing troposcatter communications, comprising the steps of:
   forming a signal;
   transmitting said signal in a time domain;
   receiving said signal;
   converting said signal to baseband;
   detecting in-phase and quadrature components of said signal;
   converting said signal to a frequency domain through a fast Fourier transform (FFT) process;
   equalizing channels in said signal;
   performing frequency search and select diversity;
   making a bandwidth available which is larger than the bandwidth of the signal;
   using a maximal ratio diversity combining technique for channel equalization according to the following formula:

$$ODC(k) = \sum_{d=1}^{d=NDIV} \frac{Hd(k)*Yd(k)^*}{|Hd(k)|^2 + |Hd(k)|/(EbNod(k))}$$

where:
   ODC(k)=Optimum Diversity Combiner
   d=diversity number
   k=frequency bin number
   NDIV=number of diversities
   Hd=frequency response of diversity d at frequency k
   Yd=Signal received at diversity d in frequency bin k
   EbNod=Energy per bit per Hz at diversity d, frequency k;
establishing reference blocks for timing synchronization and channel estimation; and
using reference symbols for channel measurements.

2. The method of claim 1, wherein said signal to be transmitted is formed according to the following steps:
   data is passed through a forward error correction encoder;
   a reference is inserted into the data;
   a cyclic prefix is inserted into the data.

3. The method of claim 2, wherein said received signal is processed according to the following steps:
   passing said signal through a low noise amplifier;
   passing said signal through a down converter;
   passing said signal via an Intermediate Frequency/Radio Frequency filter to an automatic gain controller (AGC) amplifier;
   passing said signal to a baseband converter.

4. The method of claim 3, further comprising the steps of:
   converting said signal to digital form by an analog to digital converter;
   passing said digitized signal to an extractor/splitter module wherein the reference portion of the signal is extracted and passed through a first FFT block then to a channel estimator;

passing an output of the channel estimator to a frequency shift and select diversity (FSSD) processor and an equalizer/signal combiner;

passing a data (an in-phase component and a quadrature component) portion of the signal from the analog to digital converter through a second FFT to the FSSD processor;

passing an output of the FSSD processor to the equalizer/signal combiner;

converting the signal back to the time domain by passing an output from the equalizer/signal combiner into an IFFT (inverse fast Fourier transform) processor block;

passing the output of the IFFT block to an FEC decoder which produces the final data out.

5. The method of claim 4, further comprising the steps of:

passing said reference portion of the signal to a frequency bin correlator within the channel estimator;

correlating a frequency domain version of the reference symbols with a frequency domain version of the local stored reference;

accumulating said correlated references in a frequency bin accumulator; s.

6. The method of claim 5, further comprising the steps of:

inputting to the equalizer/signal combiner the frequency domain received data signal, the channel estimate and the signal to noise ratio at each bin;

summing the results to produce the input to the IFFT block which forms the input to an FEC decoder.

* * * * *